(12) United States Patent
Xu et al.

(10) Patent No.: US 8,428,179 B1
(45) Date of Patent: Apr. 23, 2013

(54) APPARATUS AND METHOD FOR CREST FACTOR REDUCTION

(75) Inventors: Lei Xu, High Wycombe (GB); Michael Fitton, London (GB)

(73) Assignee: Altera Corporation, San Jose, CA (US)

( * ) Notice: Subject to any disclaimer, the term of this patent is extended or adjusted under 35 U.S.C. 154(b) by 505 days.

(21) Appl. No.: 12/837,087

(22) Filed: Jul. 15, 2010

(51) Int. Cl.
*H04L 25/03* (2006.01)

(52) U.S. Cl.
USPC ........... 375/296; 375/260; 375/295; 375/259; 375/285; 375/297

(58) Field of Classification Search ................ 375/260, 375/295, 296, 259, 285, 297; 332/123, 159, 332/107, 124, 160; 455/63.1, 114.2, 114.3
See application file for complete search history.

(56) References Cited

U.S. PATENT DOCUMENTS
7,292,639 B1 * 11/2007 Demirekler et al. .......... 375/260

* cited by examiner

*Primary Examiner* — Siu Lee
(74) *Attorney, Agent, or Firm* — Mauriel Kapouytian & Treffert LLP; Avavat Kapouytian

(57) ABSTRACT

Embodiments of the present invention provide an apparatus and method for crest factor reduction, in which an input time domain signal is clipped to generate a clipped signal and a difference signal, and processing operations are carried out on the difference signal, before the processed difference signal is combined with the clipped signal to generate an output time domain signal.

28 Claims, 6 Drawing Sheets

APPARATUS AND METHOD FOR CREST FACTOR REDUCTION

BACKGROUND

The present invention relates to apparatus and a method for reducing the crest factor of a signal, such as, for example, an Orthogonal Frequency Domain Multiplexing (OFDM) signal.

OFDM is widely used in wireless systems such as Third Generation Partnership Project Long Term Evolution (3GPP LTE), Wimax and Digital Video Broadcasting (DVB). OFDM signals used in these systems typically have a high Peak to Average Power Ratio (PAPR). The high PAPR of the OFDM signals increases the performance requirements on power amplifiers used in such receivers; either a highly linear power amplifier is required or some of the power efficiency of the power amplifier must be sacrificed to meet the PAPR requirement. High performance power amplifiers are costly, increasing the capital expenditure of the receiver, whilst reducing the efficiency of the power amplifier is undesirable, as low efficiency power amplifiers require additional components for cooling, whilst also increasing the operational expenditure of the receiver and wasting energy, since they consume more power than high efficiency amplifiers.

In an attempt to alleviate these problems, a crest factor reduction (CFR) block is sometimes introduced in OFDM transmitters upstream of the power amplifier to reduce the PAPR of an input signal, thereby reducing the linearity requirement of the power amplifier, allowing a lower specification (and therefore lower cost) amplifier to be used in the receiver. The CFR stage typically operates by clipping the input signal such that its amplitude envelope falls below a threshold within which the power amplifier can operate satisfactorily. Increasing pressure to reduce the cost of OFDM systems has led manufacturers to consider using lower cost components, such as lower performance amplifiers. Existing CFR blocks cannot be used in systems which employ such lower performance amplifiers, as they cannot produce an output signal with a PAPR which is low enough for satisfactory performance of the power amplifier whilst also guaranteeing an acceptable error vector magnitude (EVM) in the system.

SUMMARY

An embodiment of a first aspect of the invention provides a crest factor reduction apparatus, the apparatus including a difference calculation block which is configured to decompose an input time domain signal into a clipped signal including that portion of the input signal having a magnitude which is equal to or less than a threshold and a difference signal including that portion of the input signal which exceeds the threshold; a first transformation block which is configured to convert the time domain difference signal into a frequency domain difference signal; a processing block which is configured to apply a magnitude constraint to the frequency domain difference signal to generate a constrained frequency domain difference signal; a second transformation block which is configured to convert the constrained frequency domain difference signal into a time domain signal; and an adder block which is configured to combine the time domain signal produced by the second transformation block with the clipped signal to generate an output time domain signal.

Embodiments of the apparatus of the present invention provide a crest factor reduction system in which low cost and highly flexible components can be used, since processing is performed on the difference signal which has a small signal range and thus imposes low dynamic range requirements on components such as amplifiers, signal processing blocks and the like which are used to process the difference signal.

The crest factor reduction apparatus may further include a delay block which is configured to delay the clipped signal before it is combined with the time domain signal so produced to ensure that the clipped signal is time-aligned with the time domain signal produced by the second transformation block.

The difference calculation block may be configured to maintain the phase component of the input time domain signal constant.

The difference calculation block may include a first Coordinate Rotation Digital Computer (CORDIC) for converting the time domain input signal into a polar representation thereof, an adder block which is configured to subtract the threshold from the magnitude of the time domain difference signal to generate a polar magnitude, a second CORDIC for converting the polar magnitude output by the adder block and the phase component of the input time domain signal into the output time difference signal.

The crest factor reduction apparatus may further include a further adder block which is configured to subtract the time domain difference signal from the input time domain signal to generate the clipped signal.

The processing block may be configured to maintain the phase component of the frequency domain difference signal constant.

The processing block may include a first CORDIC for converting the frequency domain difference signal into a polar representation thereof, an adder block which is configured to subtract from a magnitude component of the frequency domain difference signal a maximum EVM value to generate a constrained polar magnitude value and a second CORDIC for converting the constrained polar magnitude output by the adder block and the phase component of the frequency domain difference signal into the constrained frequency domain difference signal.

The processing block may further include a mask and a comparing block, where the comparing block is configured to combine the mask with the magnitude component of the polar representation of the frequency domain difference signal and to attenuate out-of-band frequency components in the frequency domain difference signal.

The first transformation block may be configured to perform a Fast Fourier Transform (FFT) on the time domain difference signal.

The second transformation block may be configured to perform an Inverse Fast Fourier Transform (IFFT) on the constrained frequency domain difference signal.

The crest factor reduction apparatus may further include a transformation block for converting a received frequency domain signal into the input time domain signal.

The transformation block may be configured to perform an IFFT on the received frequency domain signal.

The received frequency domain signal may be an OFDM signal.

An embodiment of a second aspect of the invention provides a method for processing an input time domain signal, the method including: decomposing the input time domain signal into a clipped signal including that portion of the input signal having a magnitude which is equal to or less than a threshold and a difference signal including that portion of the input signal having a magnitude which exceeds the threshold; converting the time domain difference signal into a frequency domain difference signal; applying a magnitude constraint to the frequency domain difference signal to generate a constrained frequency domain difference signal; converting the constrained frequency domain difference signal into a time domain signal; and combining the time domain signal so produced with the clipped signal to generate an output time domain signal.

The clipped signal may be delayed before being combined with the time domain signal so produced to ensure that the clipped signal is time-aligned with the time domain signal so produced.

In decomposing the input time domain signal into the clipped signal and the difference signal a phase component of the input time domain signal may be maintained constant.

Decomposing the input time domain difference signal into the clipped signal and the difference signal may include converting the time domain input signal into a polar representation thereof, subtracting the threshold from the magnitude of the time domain difference signal to generate a polar magnitude, and converting the polar magnitude so generated and the phase component of the input time domain signal into the output time difference signal.

Decomposing the input time domain difference signal into the clipped signal and the difference signal may further include subtracting the time domain difference signal from the input time domain signal to generate the clipped signal.

In applying a magnitude constraint to the frequency domain difference signal a phase component of the frequency domain difference signal may be maintained constant.

Applying a magnitude constraint to the frequency domain difference signal may include converting the frequency domain difference signal into a polar representation thereof, subtracting from a magnitude component of the frequency domain difference signal a maximum EVM value to generate a constrained polar magnitude value and converting the constrained polar magnitude so generated and the phase component of the frequency domain difference signal into the constrained frequency domain difference signal.

Applying a magnitude constraint to the frequency domain difference signal may further include combining a mask with the magnitude component of the polar representation of the frequency domain difference signal to attenuate out-of-band frequency components in the frequency domain difference signal.

Converting the time domain difference signal into a frequency domain difference signal may include performing an FFT on the time domain difference signal.

Converting the constrained frequency domain difference signal into a time domain signal may include performing an IFFT on the constrained frequency domain difference signal.

The method may further include converting a received frequency domain signal into the input time domain signal.

Converting the received frequency domain signal into the input time domain signal may include performing an IFFT on the received frequency domain signal.

The received frequency domain signal may be an OFDM signal.

An embodiment of a third aspect of the invention provides an integrated circuit (IC) implementing an apparatus according to embodiments of the first aspect of the invention.

An embodiment of a fourth aspect of the invention provides a data carrier containing instructions for causing data processing equipment to perform a method according to embodiments of the second aspect of the invention.

BRIEF DESCRIPTION OF THE DRAWINGS

The novel features of the invention are set forth in the appended claims. However, for purpose of explanation, several aspects of particular embodiments of the invention are described by reference to the following figures:

DETAILED DESCRIPTION

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
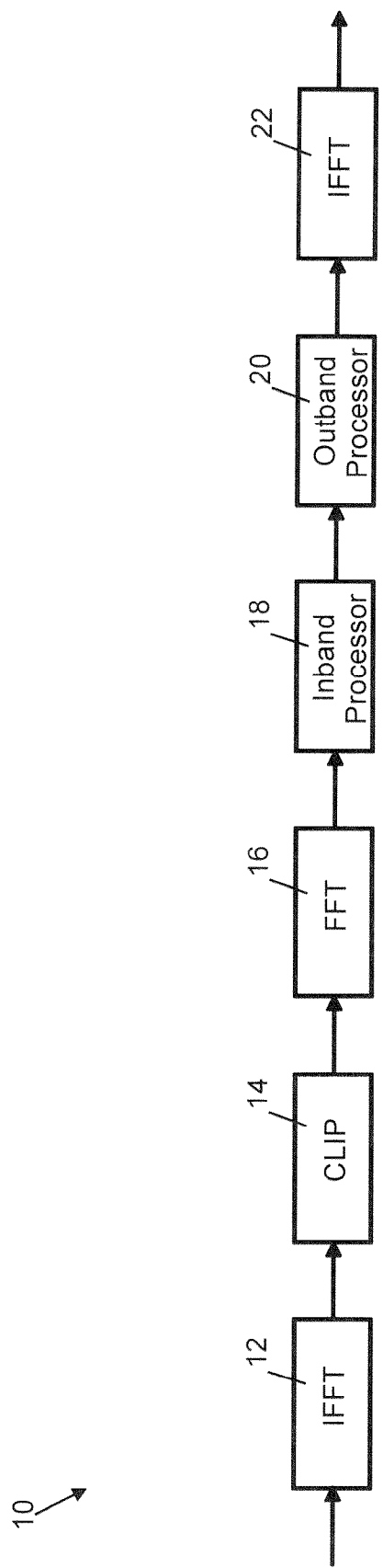
FIG. 1 is a schematic illustration showing processing blocks in a known CFR system.

Referring first to the schematic block diagram of FIG. 1, a known CFR system is shown generally at 10. It is to be understood that the schematic representation of FIG. 1 shows functional blocks of a known CFR system, which are not necessarily representative of physical components of the system but are used only for the purpose of describing the operation of the CFR system 10.

The known CFR system 10 includes an IFFT block 12 which converts an incoming OFDM frequency domain signal into a time domain signal.

This time domain signal is passed to a polar clipping block 14, which is operative to clip the time domain signal when its magnitude envelope exceeds a predetermined threshold value. This has the effect of limiting the magnitude envelope of the time domain signal to the threshold value. Of course, components of the clipped time domain signal may have a magnitude which is smaller than the threshold value. By limiting the maximum magnitude of the time domain signal to the threshold value in this way the PAPR of the clipped time domain signal is reduced in comparison to the time domain signal output by the IFFT block 12. This in turn reduces the performance requirement of downstream components such as power amplifiers.

The clipped time domain signal output by the polar clipping block 14 is passed to an FFT block 16, which converts the clipped time domain signal into a frequency domain signal for downstream processing.

The frequency domain signal output by the FFT block 16 is passed to an in-band processing block 18, which is operative to constrain the magnitude of symbols in the frequency domain signal input to the in-band processing block 18 to a maximum EVM value, to compensate for constellation errors in the frequency band of interest (i.e., the in-band signal) caused by the polar clipping which occurred in the polar clipping block 14. The EVM of a symbol is the magnitude of the difference between its actual position (in a polar symbol space) and its expected position. By restricting the EVM to a maximum value constellation errors can be reduced.

The in-band processing block 18 outputs a processed frequency domain signal to an out-of-band processing block 20, which is operative to filter the signal input to the out-of-band processing block 20 to compensate for spectral regrowth in frequency bands outside the frequency band of interest (i.e., the out-of-band signal). The output of the out-of-band processing block 20 is a frequency domain signal which has been processed to alleviate or reduce the effects of spectral regrowth, and this output signal is passed to a further IFFT block 22, which converts the incoming frequency domain signal into a time domain signal for downstream processing.

Figure 2:
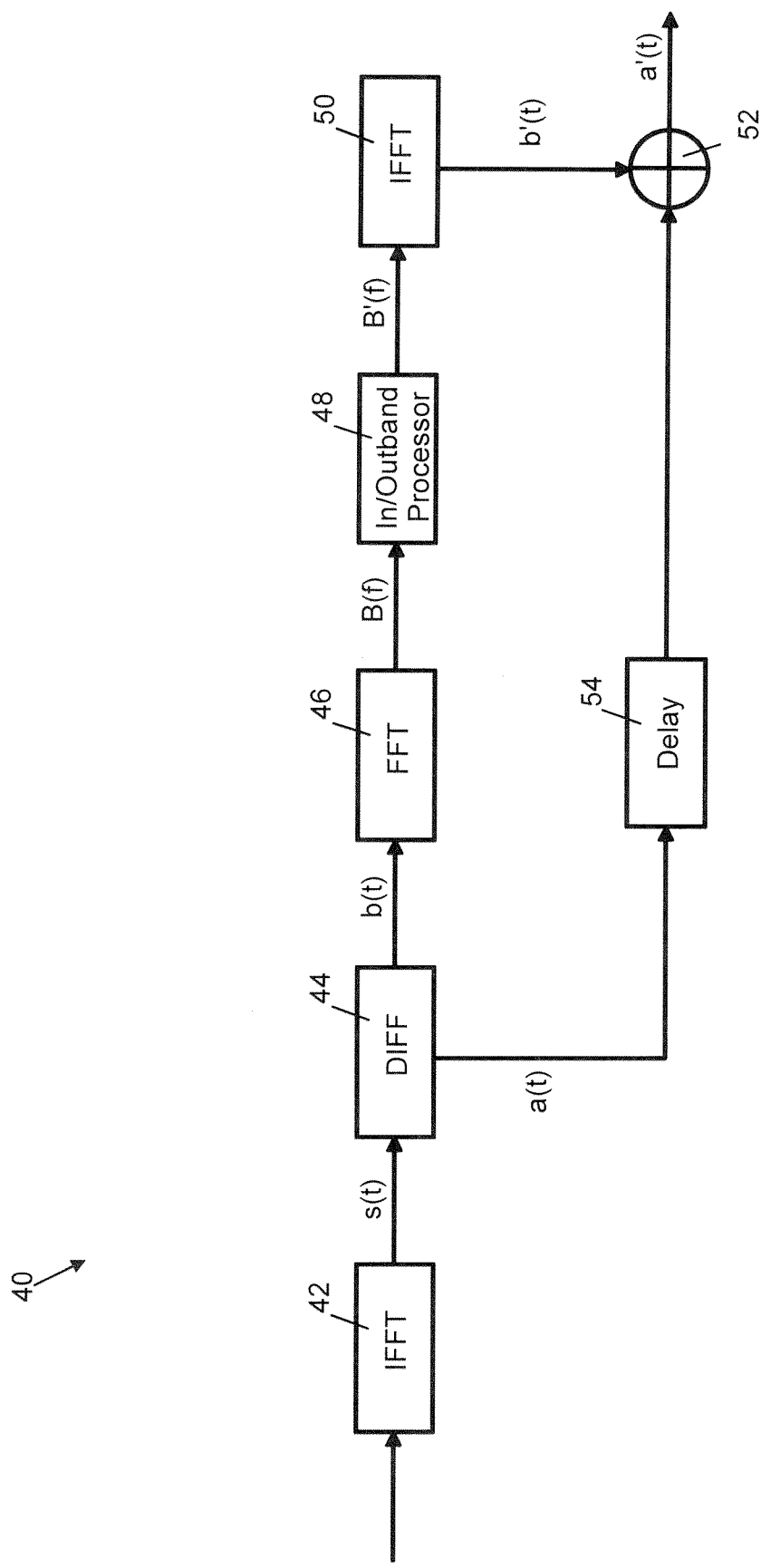
FIG. 2 is a schematic illustration showing processing blocks in a CFR system according to an embodiment of the invention.

Turning now to FIG. 2, a CFR system in accordance with an embodiment of the invention is shown generally at 40. As before, it is to be appreciated that the schematic illustration of FIG. 2 shows functional blocks of a CFR system, which are not necessarily representative of physical components of a CFR system, but are used only for the purpose of illustrating the invention.

The CFR system 40 includes an IFFT block 42 which receives at its input a frequency domain signal such as an OFDM signal. The IFFT block 42 converts the incoming frequency domain signal to a time domain signal s(t).

The time domain signal s(t) undergoes clipping in a difference calculation block 44, which is operative to apply a mathematical clipping function to the time domain input signal s(t), by comparing the time domain input signal s(t) to a threshold value. The difference calculation block 44 produces two time domain output signals. The first of these output signals is a clipped signal a(t), which is made up of the portion of the input signal s(t) whose magnitude falls below or equals the threshold value. The second time domain output signal of the difference calculation block 44 is a difference signal b(t), which is made up of the portion of the input signal s(t) whose magnitude exceeds the threshold. It will be appreciated that by selecting an appropriate threshold value the difference signal can be made to have a magnitude envelope which is considerably smaller than that of the input signal s(t).

The difference signal b(t) is passed to an FFT block 46 which performs an FFT on the difference signal to generate as an output a frequency domain signal B(f). The FFT block 46 may be, for example, a microprocessor or digital signal processor (DSP) executing appropriate instructions for performing the FFT on the difference signal b(t), or an appropriately configured ASIC or FPGA based accelerator.

As is discussed above, the difference signal b(t) has a magnitude envelope which is considerably smaller than that of the time domain signal s(t) which is input to the difference calculation block 44. Thus, the input dynamic range of the FFT block 46 can be much smaller than that of the FFT block 16 of the known CFR system 10. This permits the use of lower performance and hence lower cost components in the FFT block 46 of the CFR system 40.

The frequency domain signal B(f) output by the FFT block 46 is passed to an in-band/out-of-band processing block 48, which is operative to constrain the magnitude of symbols in the frequency domain signal B(f) input to the in-band/out-of-band processing block 48 to a maximum EVM value, to compensate for constellation errors in the frequency band of interest (i.e., the in-band signal) caused by the polar clipping which occurred in the polar difference calculation block 44.

The in-band/out-of-band processing block 48 is also operative to process the frequency domain signal B(f) to compensate for spectral regrowth in the out-of-band signal. The in-band/out-of-band processing block 48 applies a spectral mask to the frequency domain signal B(f) to constrain the magnitude of out-of-band signals to an acceptable level.

As the in-band/out-of-band processing block 48 processes only the frequency domain version B(f) of the difference signal b(t), in-band and out-of-band processing can be combined into a single block, thus improving the throughput of the CFR system 40 in comparison to the known CFR system 10.

The in-band/out-of-band processing block 48 produces as an output a processed frequency domain signal B'(f), which is passed to an IFFT block 50, which converts the processed frequency domain signal B'(f) into a time domain signal b'(t). This time domain signal b'(t) is added to a delayed version of the clipped signal a(t) in an adder block 52, which outputs a reconstructed time domain signal a'(t), which is equal to a(t)+b'(t). This reconstructed output signal is thus made up of a delayed version of the clipped signal a(t) and the processed difference signal b'(t).

The clipped signal a(t) output by the difference calculation block 44 passes through a delay block 54 before being added to the signal b'(t) to ensure that a delay incurred in the processing of the difference signal b(t) to generate the signal b'(t) is also incurred by the clipped signal, to ensure that the clipped signal a(t) is time-aligned with the correct portion of the signal b'(t), which ensures that the output signal a'(t) is constructed so as to permit correct downstream processing of the reconstructed signal a'(t).

The CFR system 40 illustrated in FIG. 2 gives similar performance to the known CFR system 10 illustrated in FIG. 1, whilst permitting lower performance and hence lower cost components to be used. A mathematical description of the operation of the CFR system 40 of FIG. 2 is given below, with reference to the constellation diagram of FIG. 3.

In the difference calculation block 44, the time domain signal s(t) is decomposed into a clipped signal a(t) and a difference signal b(t). The clipped signal is generated using a mathematical function which provides that:

$a(t) = s(t)$ if $|s(t)| \le A_{max}$, where $A_{max}$ is a threshold value, and $a(t) = A_{max} e^{j\angle s(t)}$ if $|s(t)| > A_{max}$.

The difference signal b(t)=s(t)−a(t).

In the FFT block 46, the frequency domain difference signal B(f) is generated, where B(f)=S(f)−A(f).

Figure 3:
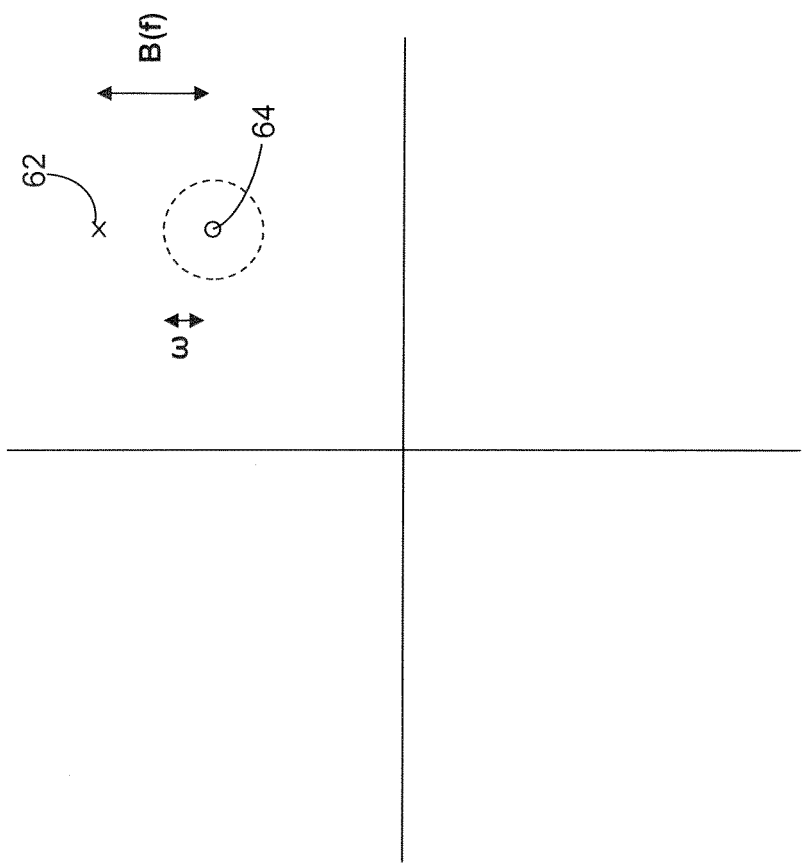
FIG. 3 is a constellation diagram for use in illustrating the operation of a CFR system.

B(f) is the error vector between the constellation point 62 of an OFDM symbol produced by the clipped signal on an OFDM subcarrier at frequency f and the expected constellation point 64 of the OFDM symbol for that subcarrier, as is shown in the constellation diagram of FIG. 3.

The in-band/out-of-band processing block 48 is operative to constrain the magnitude of B(f) to a value ω corresponding to a maximum permitted EVM value to generate the processed frequency domain signal B'(f). To do this, the in-band/out-of-band processing block performs the following mathematical operation:

$B'(f)=0$ if $|B(f)| \le \omega$ and $B'(f)=(|B(f)|-\omega)e^{j\angle B(f)}$ otherwise.

The IFFT block 50 converts the processed frequency domain signal B'(f) into a time domain signal b'(t), and this signal is added to the delayed version of the clipped time domain signal a(t) in the adder block 52 to generate the reconstructed clipped time domain signal a'(t)=a(t)+b'(t).

The frequency domain error vector between the original constellation point of the received frequency domain OFDM symbol for the OFDM subcarrier at frequency f and the constellation point for the reconstructed OFDM symbol at frequency f is:

$$F(s(t) - a'(t)) = F(s(t) - a(t) - b'(t))$$
$$= S(f) - A(f) - B'(f)$$

As B(f)=S(f)−A(f), then $$F(s(t)-a'(t))=B(f)-B'(f).$$

Since $B'(f) = 0$      if $|B(f)| \leq \omega$ and $B'(f) = (|B(f)| - \omega)e^{j\angle B(f)}$    otherwise, it follows that:

$B(f) - B'(f) = B(f)$      if $|B(f)| \leq \omega$ and $B(f) - B'(f) = B(f) - (|B(f)| - \omega)e^{j\angle B(f)}$    otherwise.

Thus, the magnitude of F(s(t)−a'(t)) is $$|F(s(t)-a'(t))| \leq \omega.$$

Thus, the magnitude of the frequency domain error vector between the original constellation point of the received frequency domain OFDM symbol for the OFDM subcarrier at frequency f and the constellation point for the reconstructed OFDM symbol at frequency f is always equal to or less than the maximum permitted EVM $\omega$.

Figure 4:
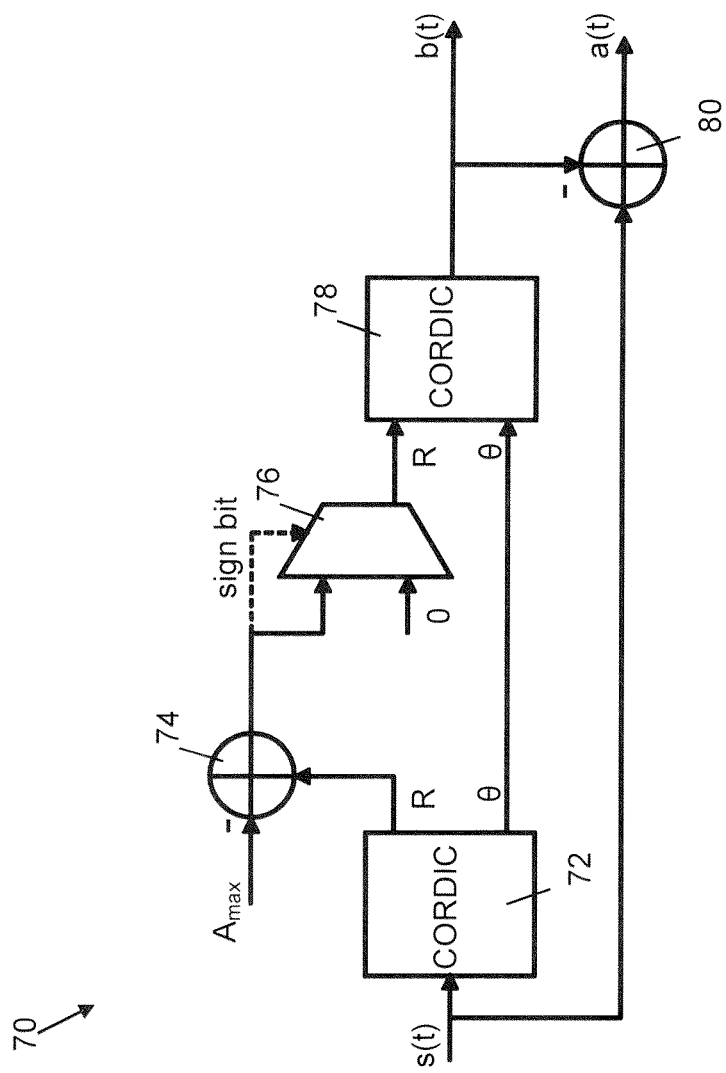
FIG. 4 is a schematic illustration showing processing blocks in an exemplary difference calculation block of the CFR system of FIG. 2.

Turning now to FIG. 4, an exemplary difference calculation block for use in the CFR system of FIG. 2 is shown generally at 70. As before, it is to be appreciated that the schematic illustration of FIG. 4 shows functional blocks of a difference calculation block, which are not necessarily representative of physical components of such a difference calculation block, but are for illustrative purposes only.

The difference calculation block is shown generally at 70 and includes a first CORDIC 72 which receives at an input thereof the time domain signal s(t). The first CORDIC 72 is operative to convert the input time domain signal s(t) into a polar representation of the input signal s(t).

The real part, i.e. the magnitude, of the converted time domain signal s(t) is passed to an adder block 74, which is operative to subtract the magnitude of the converted time domain signal s(t) from a threshold value $A_{max}$. An output of the adder block 74, which is equal to $|s(t)|-A_{max}$ (i.e., the difference between the magnitude of the input signal s(t) and the threshold value $A_{max}$) is passed to an input of a selector 76, which has another input which receives a constant input signal with a magnitude value of 0. A sign bit indicative of the sign of the output of the adder block 74 is also passed to the selector 76.

The selector 76 and the adder block 74 are operative to implement the mathematical clipping function applied to the time domain input signal s(t). The output of the selector 76 is dependent upon the difference value generated by the adder block 74. If this difference value is positive, as indicated by the sign bit passed to the selector 76, the output of the selector 76 is equal to the difference between the magnitude of the input signal s(t) and the threshold value $A_{max}$. If the difference value is negative, indicating that the magnitude of the time domain signal s(t) is smaller than $A_{max}$, the output of the selector 76 is 0.

The output of the selector 76 is passed to an input of a second CORDIC 78, which receives at another input thereof an output signal of the first CORDIC 72 which provides the phase of the input time domain signal s(t). The first CORDIC 72 calculates the phase of the input time domain signal s(t) and passes it directly to the second CORDIC 78. Thus, the phase of the input time domain signal s(t) is maintained in the output difference signal b(t).

The second CORDIC 78 is operative to convert the input magnitude and phase signals into an output difference signal b(t) having real and imaginary components. This difference signal b(t) is passed to a second adder block 80, which is operative to subtract the difference signal b(t) generated by the second CORDIC 78 from the input time domain signal s(t) to generate a clipped signal a(t). Thus, the difference calculation block 70 receives the input time domain signal s(t) and the threshold value $A_{max}$, and generates the clipped signal a(t) and the difference signal b(t).

Figure 5:
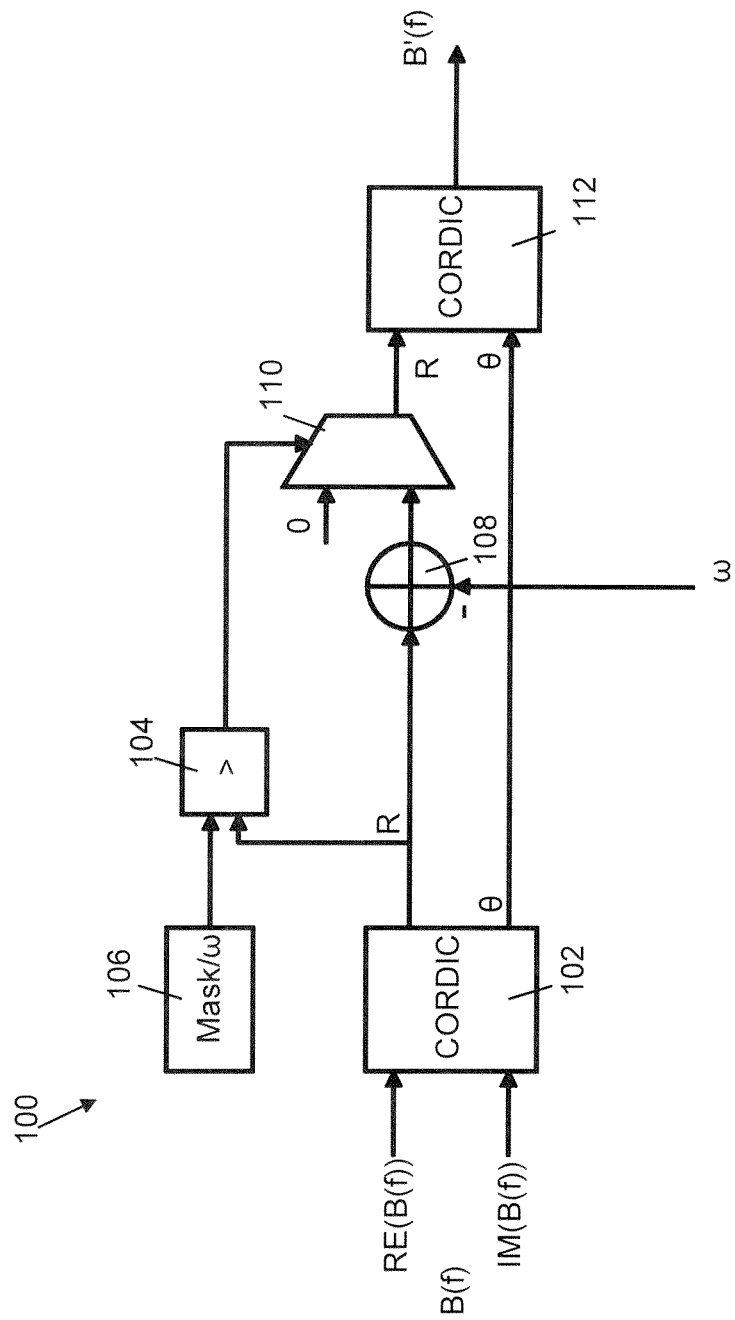
FIG. 5 is a schematic illustration showing processing blocks in an exemplary in-band/out-of-band processing block of the CFR system of FIG. 2.

FIG. 5 is a schematic representation showing an exemplary in-band/out-of-band processing block for use in the CFR system of FIG. 2. As before, it is to be appreciated that the schematic illustration of FIG. 5 shows functional blocks of an in-band/out-of-band processing block, which are not necessarily representative of physical components of such an in-band/out-of-band processing block, but are for illustrative purposes only.

The in-band/out-of-band processing block is shown generally at 100, and includes a first CORDIC 102 which receives the frequency domain difference signal B(f), as real and imaginary components. The first CORDIC 102 converts the real and imaginary parts of the frequency domain difference signal B(f) into a polar representation of the signal. The magnitude of this polar representation is passed to a comparing block 104, where a mask 106 is applied to constrain the magnitude of out-of-band signals (such as interference signals) to a tolerable maximum value.

The in-band/out-of-band processing block is operative to constrain the magnitude of the frequency domain difference signal B(f) to the maximum permissible EVM value $\omega$. To this end, the maximum permissible EVM value $\omega$ is subtracted from the magnitude of the incoming frequency domain difference B(f) in an adder block 108. The signal output by the adder block 108, which is equal to $|B(f)|-\omega$, is passed to a first input of a selector block 110, which has another input which receives a signal with a constant magnitude value of 0. The selector block 110 also receives the signal output by the comparing block 104.

The selector block 110 outputs a signal which is dependent upon the magnitude of the masked signal output by the comparing block 104. If the magnitude of the masked input signal is less than or equal to $\omega$, the selector block 110 outputs a signal with a magnitude of 0. Otherwise, the signal output by the selector block 110 has a magnitude of $|B(f)|-\omega$.

The output of the selector block 110 is passed to a magnitude input of a second CORDIC 112. The second CORDIC 112 also has a phase input, which is connected directly to the phase output of the first CORDIC 102. The second CORDIC 112 is configured to convert the processed polar representation of the frequency domain signal into an output signal B'(f) having real and imaginary parts. This output signal B'(f) is equal to 0 if $|B(f)| \leq \omega$ and is equal to $(|B(f)|-\omega)e^{j\angle B(f)}$ otherwise.

It will be appreciated that while the CFR system 40, the difference calculation block 70 and the in-band/out-of-band processing block 100 have been described above in terms of functional blocks, they could be implemented in a variety of ways, for example as circuits made up of discrete electronic components, in one or more suitably programmed general purpose processors, DSPs, FPGAs, ASICs or as one or more computer programs stored on appropriate data carriers such that when executed the computer program(s) cause a computer to perform the CFR method described above.

Figure 6:
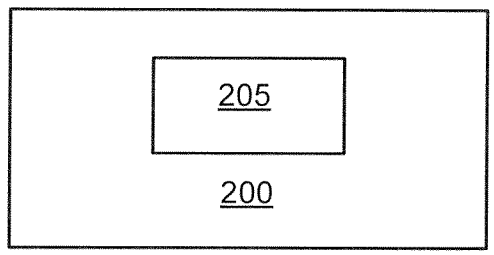
FIG. 6 illustrates a block diagram of an IC implementing embodiments of an apparatus or system of the present invention.

As known by those skilled in the art, general purpose processors, DSPs, FPGAs, and ASICs are examples of integrated circuits (ICs). Accordingly, the term IC encompasses the above examples of ICs as well as other ICs. It is to be noted that embodiments of the apparatuses or systems of the present invention may be implemented in ICs generally. FIG. 6 illustrates a block diagram of an IC implementing embodiments of an apparatus or system of the present invention. In FIG. 6, IC 200 may be a general purpose processor, a DSP, an FPGA, an ASIC, or any other type of IC, which implements embodiments of an apparatus or system 205 of the present invention.

Figure 7:
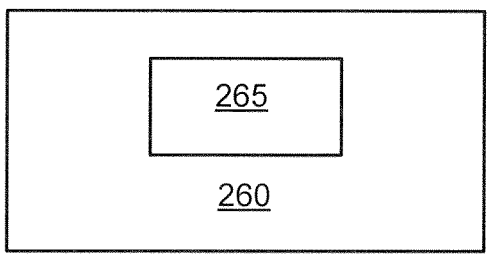
FIG. 7 illustrates a block diagram of a data carrier containing instructions for performing embodiments of a method of the present invention.

FIG. 7 illustrates a block diagram of a data carrier 260 (e.g., a memory device) containing instructions 265 (e.g., computer program instructions) for performing embodiments of a method of the present invention. In one embodiment, the instructions 265 are for causing a data processing equipment or system (e.g., an IC or a computer) to perform embodiments of a method of the present invention. The data carrier 260 may be any suitable medium that may contain such instructions.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A crest factor reduction apparatus, the apparatus comprising:
   a difference calculation block which is configured to decompose an input time domain signal into a clipped signal comprising that portion of the input signal having a magnitude which is equal to or less than a threshold and a difference signal comprising that portion of the input signal which exceeds the threshold;
   a first transformation block coupled to the difference calculation block and configured to convert the time domain difference signal into a frequency domain difference signal;
   a processing block which is configured to apply a magnitude constraint to the frequency domain difference signal to generate a constrained frequency domain difference signal;
   a second transformation block coupled to the processing block and configured to convert the constrained frequency domain difference signal into a time domain signal; and
   an adder block which is configured to combine the time domain signal produced by the second transformation block with the clipped signal to generate an output time domain signal.

2. The crest factor reduction apparatus of claim 1 further comprising a delay block coupled to the difference calculation block and configured to delay the clipped signal before it is combined with the time domain signal so produced to ensure that the clipped signal is time-aligned with the time domain signal produced by the second transformation block.

3. The crest factor reduction apparatus of claim 1, wherein the difference calculation block is configured to maintain a phase component of the input time domain signal constant.

4. The crest factor reduction apparatus of claim 3, wherein the difference calculation block comprises a first CORDIC for converting the time domain input signal into a polar representation thereof, a second adder block which is configured to subtract the threshold from a magnitude of the time domain difference signal to generate a polar magnitude, a second CORDIC for converting the polar magnitude output by the second adder block and the phase component of the input time domain signal into the time domain difference signal.

5. The crest factor reduction apparatus of claim 4 further comprising a third adder block which is configured to subtract the time domain difference signal from the input time domain signal to generate the clipped signal.

6. The crest factor reduction apparatus of claim 1, wherein the processing block is configured to maintain a phase component of the frequency domain difference signal constant.

7. The crest factor reduction apparatus of claim 6, wherein the processing block comprises a first CORDIC for converting the frequency domain difference signal into a polar representation thereof, a second adder block which is configured to subtract from a magnitude component of the frequency domain difference signal a maximum Error Vector Magnitude value to generate a constrained polar magnitude value and a second CORDIC for converting the constrained polar magnitude output by the second adder block and the phase component of the frequency domain difference signal into the constrained frequency domain difference signal.

8. The crest factor reduction apparatus of claim 7, wherein the processing block further comprises a mask and a combining block, wherein the combining block is configured to combine the mask with the magnitude component of the polar representation of the frequency domain difference signal to attenuate out-of-band frequency components in the frequency domain difference signal.

9. The crest factor reduction apparatus of claim 1, wherein the first transformation block is configured to perform a Fast Fourier Transform on the time domain difference signal.

10. The crest factor reduction apparatus of claim 1, wherein the second transformation block is configured to perform an Inverse Fast Fourier Transform on the constrained frequency domain difference signal.

11. The crest factor reduction apparatus of claim 1 further comprising a transformation block coupled to the difference calculation block for converting a received frequency domain signal into the input time domain signal.

12. The crest factor reduction apparatus of claim 11, wherein the transformation block is configured to perform an Inverse Fast Fourier Transform on the received frequency domain signal.

13. The crest factor reduction apparatus of claim 11, wherein the received frequency domain signal is an Orthogonal Frequency Domain Multiplexing signal.

14. An integrated circuit implementing the apparatus of claim 1.

15. A method for processing an input time domain signal, the method comprising:
   decomposing the input time domain signal into a clipped signal comprising that portion of the input signal having a magnitude which is equal to or less than a threshold and a difference signal comprising that portion of the input signal having a magnitude which exceeds the threshold;

converting the time domain difference signal into a frequency domain difference signal;

applying a magnitude constraint to the frequency domain difference signal to generate a constrained frequency domain difference signal;

converting the constrained frequency domain difference signal into a time domain signal; and combining the time domain signal so produced with the clipped signal to generate an output time domain signal.

16. The method of claim 15, wherein the clipped signal is delayed before being combined with the time domain signal so produced to ensure that the clipped signal is time-aligned with the time domain signal so produced.

17. The method of claim 15, wherein, in decomposing the input time domain signal into the clipped signal and the difference signal, a phase component of the input time domain signal is maintained constant.

18. The method of claim 17, wherein decomposing the input time domain signal into the clipped signal and the difference signal comprises converting the time domain input signal into a polar representation thereof, subtracting the threshold from a magnitude of the time domain difference signal to generate a polar magnitude, and converting the polar magnitude so generated and the phase component of the input time domain signal into the time domain difference signal.

19. The method of claim 18, wherein decomposing the input time domain difference signal into the clipped signal and the difference signal further comprises subtracting the time domain difference signal from the input time domain signal to generate the clipped signal.

20. The method of claim 15, wherein, in applying a magnitude constraint to the frequency domain difference signal, a phase component of the frequency domain difference signal is maintained constant.

21. The method of claim 20, wherein applying a magnitude constraint to the frequency domain difference signal comprises converting the frequency domain difference signal into a polar representation thereof, subtracting from a magnitude component of the frequency domain difference signal a maximum Error Vector Magnitude value to generate a constrained polar magnitude value and converting the constrained polar magnitude so generated and the phase component of the frequency domain difference signal into the constrained frequency domain difference signal.

22. The method of claim 21, wherein applying a magnitude constraint to the frequency domain difference signal further comprises combining a mask with the magnitude component of the polar representation of the frequency domain difference signal to attenuate out-of-band frequency components in the frequency domain difference signal.

23. The method of claim 15, wherein converting the time domain difference signal into a frequency domain difference signal comprises performing a Fast Fourier Transform on the time domain difference signal.

24. The method of claim 15, wherein converting the constrained frequency domain difference signal into a time domain signal comprises performing an Inverse Fast Fourier Transform on the constrained frequency domain difference signal.

25. The method of claim 15 further comprising converting a received frequency domain signal into the input time domain signal.

26. The method of claim 25, wherein converting the received frequency domain signal into the input time domain signal comprises performing an Inverse Fast Fourier Transform on the received frequency domain signal.

27. The method of claim 25, wherein the received frequency domain signal is an Orthogonal Frequency Domain Multiplexing signal.

28. A non-transitory computer readable medium containing instructions for causing data processing equipment to perform the method of claim 15.

* * * * *